US007962668B2

United States Patent
Ding (10) Patent No.: US 7,962,668 B2
(45) Date of Patent: *Jun. 14, 2011

(54) USB AUDIO CONTROLLER

(75) Inventor: Rong-Hwa Ding, Taipei County (TW)

(73) Assignee: Solid State System Co., Ltd., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/541,168

(22) Filed: Aug. 14, 2009

(65) Prior Publication Data

US 2010/0161857 A1    Jun. 24, 2010

Related U.S. Application Data

(63) Continuation-in-part of application No. 12/342,019, filed on Dec. 22, 2008.

(30) Foreign Application Priority Data

Apr. 30, 2009   (CN) .......................... 2009 1 0132300

(51) Int. Cl.
   *G06F 13/14* (2006.01)
(52) U.S. Cl. ................. 710/31; 710/33; 710/62; 710/72
(58) Field of Classification Search ....................... None
   See application file for complete search history.

(56) References Cited

U.S. PATENT DOCUMENTS

| | | | |
|---|---|---|---|
| 6,741,964 B2 * | 5/2004 | Okano | 704/270 |
| 6,859,609 B1 * | 2/2005 | Watkins | 386/46 |
| 6,900,980 B2 * | 5/2005 | Christopher | 361/679.31 |
| 7,027,978 B2 * | 4/2006 | Okano | 704/201 |
| 7,143,201 B2 * | 11/2006 | Watanuki | 710/11 |
| 7,216,221 B2 * | 5/2007 | Bear et al. | 713/1 |
| 7,730,236 B2 * | 6/2010 | Hu et al. | 710/37 |
| 2004/0187157 A1 * | 9/2004 | Chong et al. | 725/86 |
| 2004/0208492 A1 * | 10/2004 | Oguro | 386/117 |
| 2004/0215452 A1 * | 10/2004 | Pearah et al. | 704/231 |
| 2004/0252560 A1 * | 12/2004 | Hsieh | 365/199 |
| 2005/0055479 A1 * | 3/2005 | Zer et al. | 710/22 |
| 2005/0184161 A1 * | 8/2005 | Chen et al. | 235/486 |
| 2005/0201736 A1 * | 9/2005 | Lee | 386/96 |
| 2006/0007151 A1 * | 1/2006 | Ram | 345/163 |
| 2006/0294262 A1 * | 12/2006 | Su | 710/13 |
| 2007/0104461 A1 * | 5/2007 | Cho | 386/96 |
| 2007/0115953 A1 * | 5/2007 | Chen et al. | 370/359 |
| 2007/0133523 A1 * | 6/2007 | Kwon | 370/356 |
| 2007/0286275 A1 * | 12/2007 | Kimura et al. | 375/240.01 |
| 2008/0015715 A1 * | 1/2008 | Shen | 700/94 |
| 2008/0037725 A1 * | 2/2008 | Berstis et al. | 379/88.13 |
| 2008/0107045 A1 * | 5/2008 | Berstis et al. | 370/263 |
| 2008/0121092 A1 * | 5/2008 | Drel et al. | 84/612 |
| 2008/0205874 A1 * | 8/2008 | Chen | 396/419 |
| 2008/0282010 A1 * | 11/2008 | Huang et al. | 710/305 |
| 2009/0011794 A1 * | 1/2009 | Seo | 455/557 |
| 2009/0182935 A1 * | 7/2009 | Pizzarulli et al. | 711/103 |
| 2010/0161856 A1 * | 6/2010 | Ding | 710/62 |

* cited by examiner

*Primary Examiner* — Cheng-Yuan Tseng
(74) *Attorney, Agent, or Firm* — Jianq Chyun IP Office (57) ABSTRACT

A USB audio controller includes a USB interface unit, an audio interface unit, a storage interface unit, and a processing unit. The USB interface unit is used to connect to a USB bus for communicating with a host by a communication information. The audio interface unit is used to connect to at least one audio device for communicating with an audio signal. The storage interface unit is used to connect to a memory unit for communicating storage information. The processing unit is for processing the communicating information, storage information, or audio signal.

11 Claims, 6 Drawing Sheets

USB AUDIO CONTROLLER

CROSS-REFERENCE TO RELATED APPLICATION

This application is a continuation-in-part application and claims the priority benefit of U.S. application Ser. No. 12/342,019, filed on Dec. 22, 2008. This application also claims the priority benefit of China application No. 200910132300.4, filed on Apr. 30, 2009. The entirety of the above-mentioned patent applications is hereby incorporated by reference herein and made a part of the specification.

BACKGROUND OF THE INVENTION

1. Field of Invention

The present invention relates to audio processing. More particularly, the present invention relates to a dual mode audio controller.

2. Description of Related Art

Universal serial bus (USB) is well known in signal communication for transmitting data. Computer system and various peripheral devices have widely adopted the USB port for transmitting data. A USB audio device can be used for PC peripheral applications, such as USB VoIP (voice over internet protocol) or USB headphone set. After the USB audio device is connected to the USB host, it takes the role of PC sound card for audio signal input and output. Depending on the actually design and operation, the USB audio device can automatically replace the PC sound card. For USB VoIP application, users can have voice communication through internet. On the other side, digital music player, such as MP3 player, is often connected to the USB port of the computer system for downloading the music into the digital audio player where the music controller works as a USB storage function.

However, to have multiple-function application, the USB audio device in conventional design is composed of various devices, which are in separate operations. It causes higher system cost and may be not easy in operation. The operation has to be based on the computer system, to which the audio device is connected. How to improve the application, particularly in mobile manner, is one of the issues in consideration.

SUMMARY OF THE INVENTION

The invention provides a dual mode audio controller. Such controller can be also operated as a USB audio sound device and a USB storage device at the same time when it is connected to a USB host. When such device is disconnected from the USB host, it works as a mobile music player when a battery set is attached. Most function resources; such as CPU unit, storage unit, audio ADC, audio DAC, external earphone, and external microphone are shared in both modes so that a very cost saving solution can be achieved. In addition, add-on function like USB VoIP dialog hardware recording can be achieved with this dual mode audio controller scheme. Such function removes the complicated software effort needed in USB host in prior art.

The invention provides a universal serial bus (USB) audio controller includes a USB interface unit, an audio interface unit, a storage interface unit, and a processing unit. The USB interface unit is used to connect to a USB bus for communicating with a USB host by a communicating information. The audio interface unit can be used to connect to at least one audio device for communication of audio signal. The storage interface unit is connected to a storage unit for communication of a storage information. The processing unit having at least one processor is for processing the communicating information, the storage information, or the audio signal. When the USB interface unit is connected to the USB host, the processing unit processes a USB audio device class protocol, according to a spec of USB device class definition for audio devices. The processing unit also processes a USB storage device class protocol, according to USB mass storage class specifications. When the USB interface unit is disconnected from the USB host, the processing unit is also for processing an audio playback function with an audio source from the storage unit or for processing an audio record function to store the audio signal information into the storage unit.

The USB audio device class protocol and the USB storage device class protocol are used as the communication protocol between the USB host and the USB audio device; they can be enabled at the same time or only one of them is operating which is set by user switch. To have the controller operates as a USB storage device or USB audio device, another embodiment is to use application specific software running on the USB host to configure and communicate such controller to work as a USB storage device or a USB audio device or both functions at the same time. Wherein, the audio playback function and the recording function are achieved by communication between the storage interface unit and the audio interface unit or the communication between the USB host and the audio interface unit. When the audio controller is connected to the USB host, the storage information for communicating with the storage unit can include a first storage information, a second storage information, or both storage information. The first storage information is the original audio signal outputting from the USB host to the audio device via the audio interface unit or the compressed audio signal of the original outputting audio signal when the audio controller is connected to the USB host. The second storage information is the original audio signal inputting from the audio device via the audio interface unit and transmitted to USB host or the compressed audio signal of the original inputting audio signal when the audio controller is connected to the USB host.

The invention provides a USB audio controller includes a USB interface unit, an audio interface unit, a storage interface unit, and a processing unit. The USB interface unit is used to connect to a USB bus for communicating with a USB host by a communicating information. The audio interface unit can be used to connect to at least one audio device for communication of audio signal. The storage interface unit is connected to a storage unit for communication of a storage information. The processing unit having a hardware circuit or at least one processor is for processing the communicating information, the storage information, or the audio signal. When the USB interface unit is connected to the USB host, the processing unit processes a USB audio device class protocol, according to a spec of USB device class definition for audio devices. The processing unit also processes a USB storage device class protocol, according to USB mass storage class specifications.

The USB audio device class protocol and the USB storage device class protocol are used as the communication protocol between the USB host and the USB audio device; they can be enabled at the same time or only one of them is operating which is set by user switch. As a result, the USB audio controller can work as an audio input device or output device of the USB host and the USB storage device. To have the controller operates as a USB storage device or USB audio device, another embodiment is to use application specific software running on the USB host to configure and communicate such controller to work as a USB storage device or a USB audio device or both functions at the same time. In addition, when the audio controller is connected to the USB host, a storage information for communicating with the storage unit can include a first storage information, a second storage information, or both storage information. The first storage information is the original audio signal outputting from the USB host to the audio device via the audio interface unit or the compressed audio signal of the original outputting audio signal when the audio controller is connected to the USB host. The second storage information is the original audio signal inputting from the audio device via the audio interface unit and transmitted to USB host or the compressed audio signal of the original inputting audio signal when the audio controller is connected to the USB host.

The invention provides a USB audio controller includes a USB interface unit, an audio interface unit, a storage interface unit, and a processing unit. The USB interface unit is used to connect to a USB bus for communicating with a USB host by a communicating information. The audio interface unit can be used to connect to at least one audio device for communication of audio signal. The storage interface unit is connected to a storage unit for communication of a storage information. The processing unit having a hardware circuit or at least one processor is for processing the communicating information, the storage information, or the audio signal. When the USB interface unit is connected to the USB host, the processing unit processes a USB audio device class protocol, according to a spec of USB device class definition for audio devices, causing the USB audio controller to work as an audio peripheral device of the USB host. In an alternative manner, the processing unit is operating together with a software of the USB host, so that the USB audio controller works as an audio peripheral device of the USB host. Further, the storage information for communicating with the storage unit can include a first storage information, a second storage information, or both storage information. The first storage information is the original audio signal outputting from the USB host to the audio device via the audio interface unit or the compressed audio signal of the original outputting audio signal when the audio controller is connected to the USB host. The second storage information is the original audio signal inputting from the audio device via the audio interface unit and transmitted to USB host or the compressed audio signal of the original inputting audio signal when the audio controller is connected to the USB host.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Several embodiments are provided to describe the inventions. However, the invention is not just limited to the embodiments. Also and, the provided embodiments can be properly combined to each other.

Figure 1:
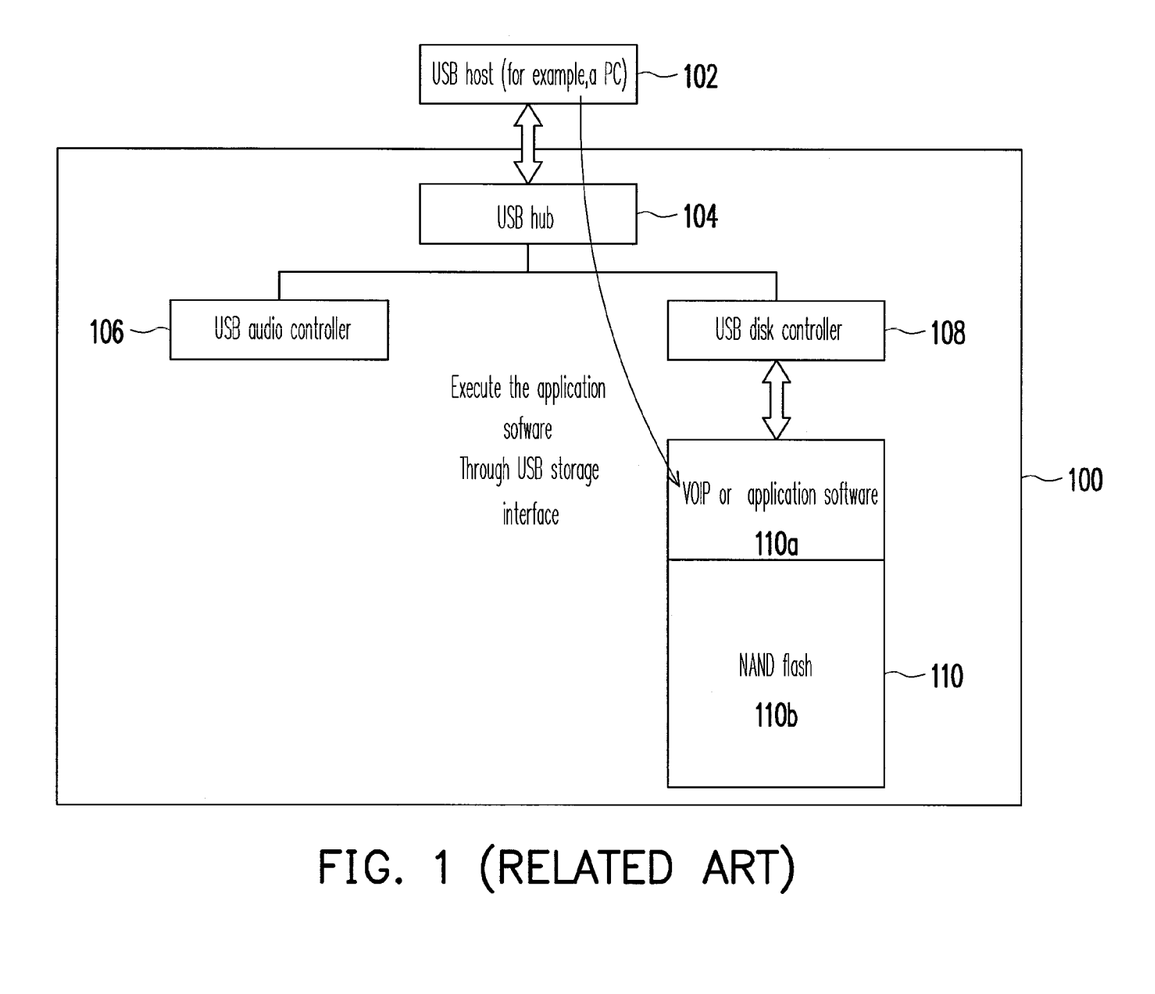
FIG. 1 is a block diagram, schematically illustrating a prior art implement the audio device based on USB protocol.

To have USB VoIP or USB audio application mobilized with the USB audio device, some considerations have been taken. FIG. 1 is a block diagram, schematically illustrating a preliminary aspect to implement the audio device based on USB protocol. In FIG. 1, a USB audio device 100 includes a USB hub 104 connects with one USB audio controller 106 and another USB disk controller 108. The USB disk controller 108 is connected to a storage unit 110, which has stored VoIP or other application software in the storage space 110a, and another is unused storage space 110b which can be used in later operation for storing some additional information. In addition, other software, such as voice mail application software, can be stored in 110a, and the USB storage unit 110 which can be of NAND flash or the nonvolatile memory, such as hard disk. The USB hub 104, the USB audio controller 106, the USB disk controller 108, and the storage unit 110 are integrated in one USB device 100. When the USB device 100 is attached to the USB host 102, the USB VoIP or the audio application software stored in the storage space 110a, such as voice mail software, or VoIP application software, can be executed by the USB host via the USB disk controller 108. The audio playback and the recording are operated via the USB audio controller 106 which can include audio DAC for playback and audio ADC for recording. With such device, the USB VoIP or audio related application software stored in storage space 110a is not needed to be pre-installed in the computer in advance before the use though the operation is running on the host.

However, the device in FIG. 1 may increase the system cost since three different ICs of controllers are needed in this device. In addition, in order to have VoIP dialog recorded into digital file, one manner is using software, which is running in the USB host, such as computer system or personal computer. Such software captures the audio signals from other application software and saves the captured audio data into the host storage unit, such as a hard disk or a flash memory in USB disk storage. The file recording application is based on software application, and then is very complicated since the software developers need to deal different operating systems and many different kinds of VoIP software which are developed by different VoIP providers.

Another possibility for such two-way recording is adding external ADC in the analog domain. However, how to store the converted audio data into the memory unit has become a problem since most memory units, such as hard disk, flash memory or memory card, cannot be directly connected to the ADC.

This kind of USB audio device is not proper in operation when the device is not connected to a USB host. It causes a waste for the resource in such device. Usually, the audio ADC, DAC, earphone unit, microphone, and storage media have constituted most parts of the key components for a mobile audio player.

Figure 2:
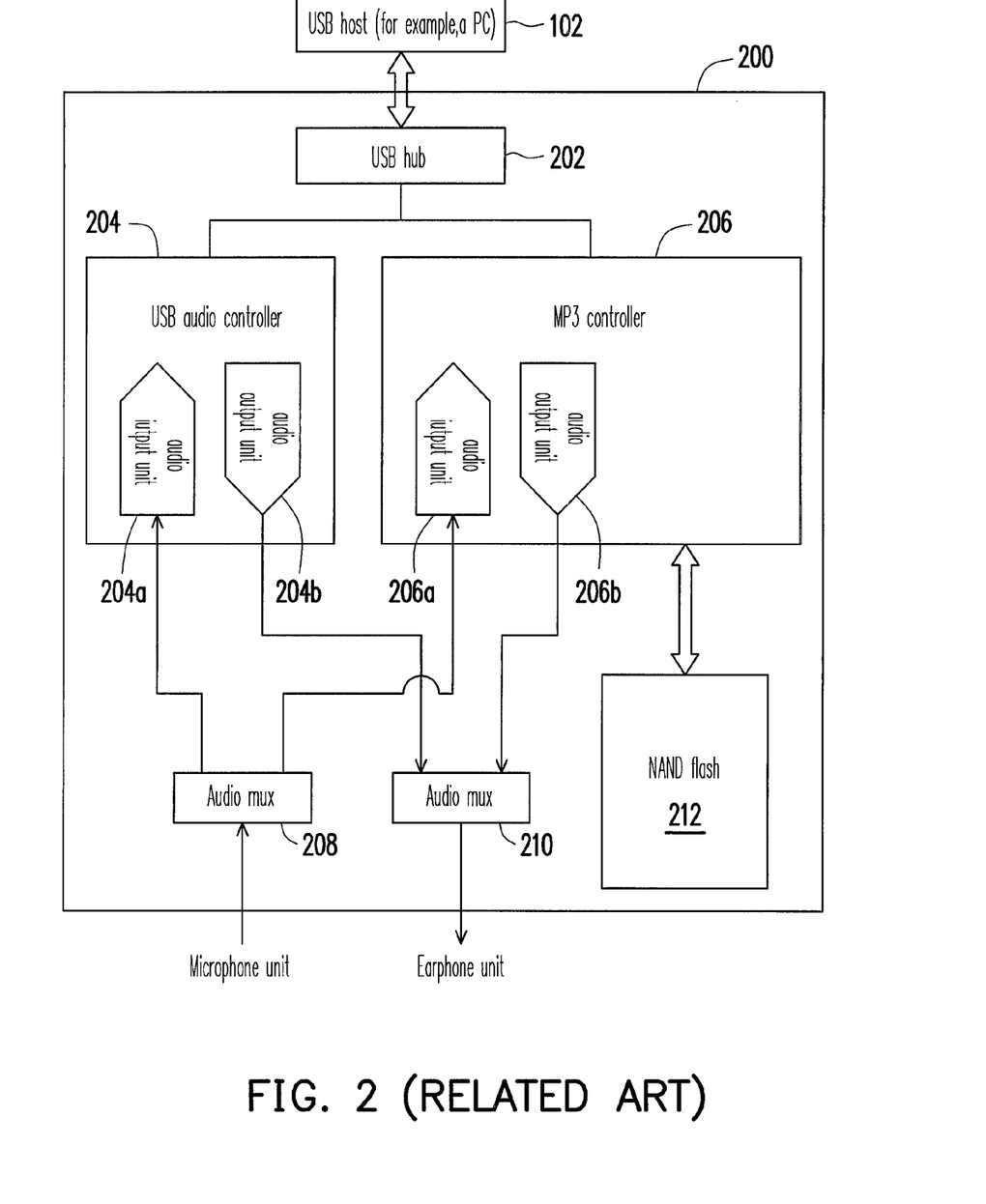
FIG. 2 is a block diagram, schematically another prior art for dual-mode USB audio device in consideration.

In order to make the arrangement work as a mobile audio device, one of possibilities is shown. FIG. 2 is a block diagram, schematically showing another design of dual-mode USB audio device in consideration. The dual-mode USB audio device 200 works as a USB audio device and USB storage unit when it is connected to a USB host 102. The function of USB audio is provided from the USB audio controller 204. The USB storage function is provided from the mobile audio controller 206, such as MP3 controller 206. The dual-mode USB audio device 200 also works as an audio player when it is disconnected from the USB host 102 and a battery set is providing power supply. In this mode, the mobile audio controller 206 playbacks the music stored in the storage unit 212 and the USB audio controller 204 is not working.

Usually, the USB audio controller 204 includes an audio input unit 204a having ADC and an audio output unit 204b having DAC. The mobile audio controller 206 also includes an audio input unit 206a having ADC and an audio output unit 206b having DAC, as well. An audio multiplexer 208 is coupled to the input units 204a, 206a of the USB audio controller 204 and the mobile audio controller 206 in selection for input by, for example, microphone unit. Another audio multiplexer 210 is also coupled to output units 204b, 206b of the USB audio controller 204 and the mobile audio controller 206 in selection for output to, for example, earphone unit. The storage unit 212, such as the NAND flash, stores the audio information for playing and allows to write-in additional audio information.

In the structure of FIG. 2, extra analog audio signal switches by the audio multiplexers 208 and 210 are added for the signal selection. The system cost for such device is high due to many extra units needed, for example, duplicated ADC and DAC, extra audio switches. For some audio controllers, which do not include ADC or DAC, still need external ADC and DAC before the audio switches. To record the USB audio data stream into digital files when this device 200 is attached to a USB host 102, it needs software effort in the USB host 102.

Figure 3:
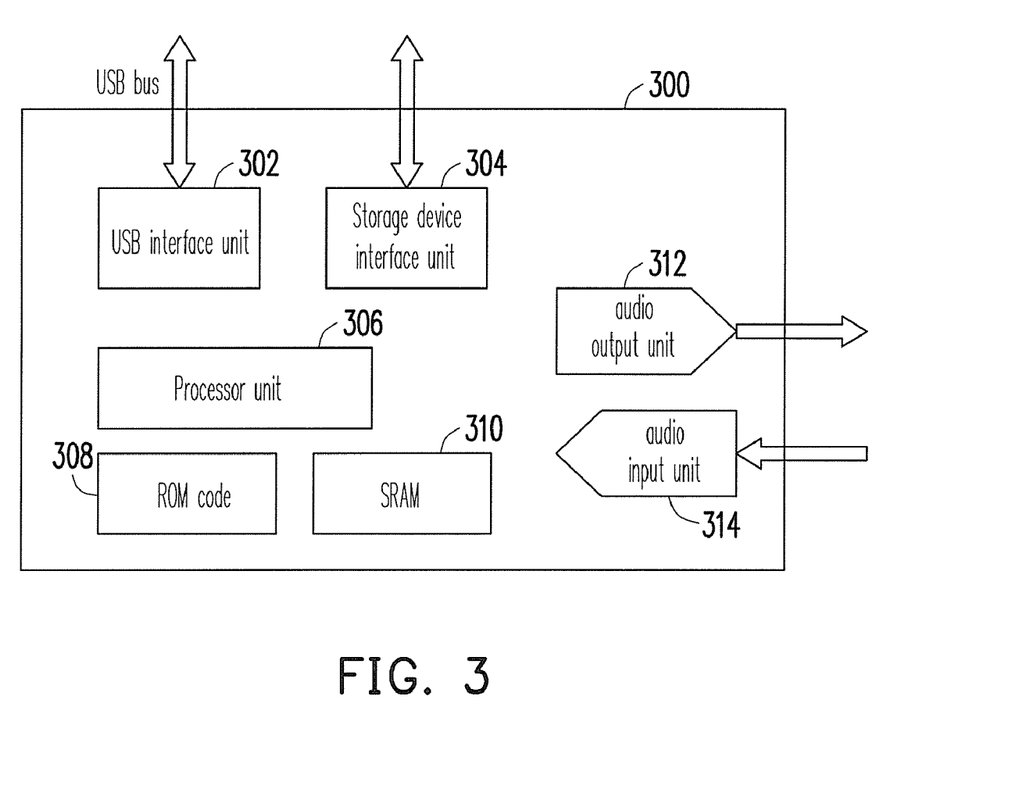
FIG. 3 is a block diagram, schematically illustrating a USB audio controller, according to an embodiment of the invention.

The present invention proposes a dual-mode USB audio controller in more function with low system cost. FIG. 3 is a block diagram, schematically illustrating a USB audio controller, according to an embodiment of the invention. The USB audio controller 300 includes, for example, a USB interface unit 302, a storage device interface unit 304, a processor unit 306, and an audio interface unit having an audio output unit 312 and an audio input unit 314. The processing unit 306 may need to have the ROM code 308, and the memory device 310, such as SRAM, for working memory for any need. Usually, the processor unit 306 has at least one processor. For example, the processor unit 306 can have, for example, DSP or MCU. However, processor unit 306 can also have multiple processors, for example, having both the DSP and MCU. In other words, the processor unit 306 has to be implemented with all the processors in need for adapting various operations.

Figure 4:
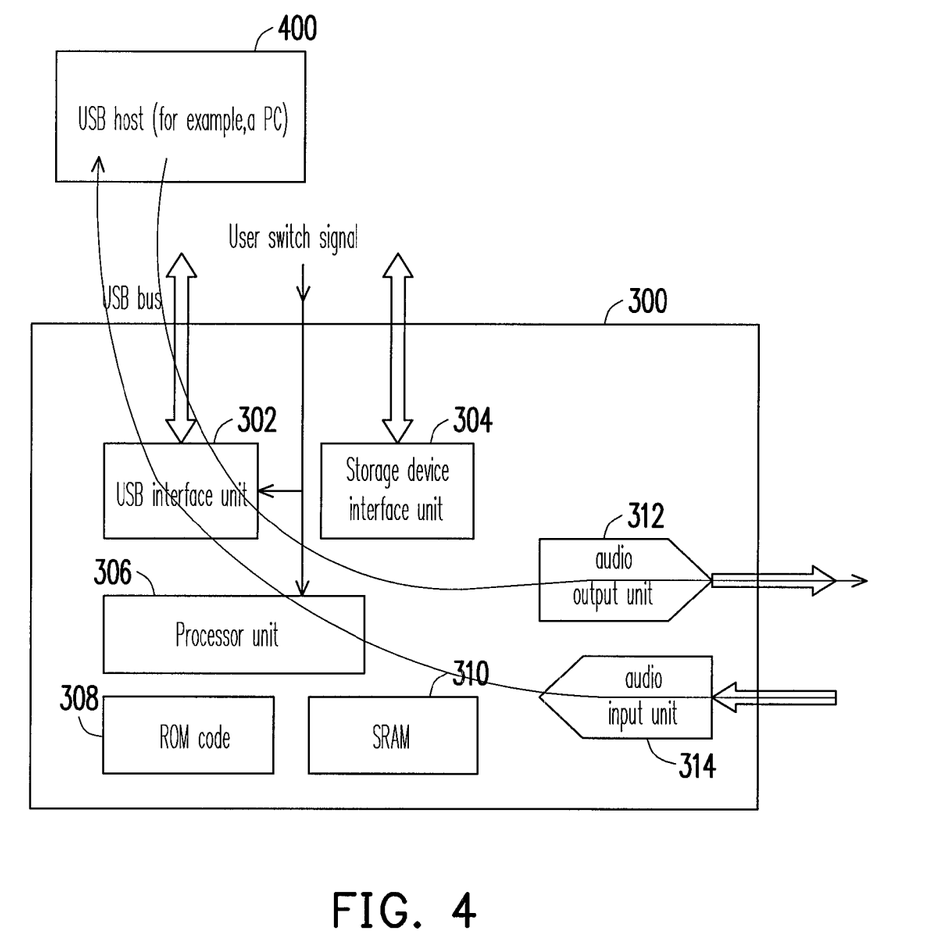
FIG. 4 is a block diagram, schematically illustrating a USB audio mode operation, according to an embodiment of the present invention.

The operation is in two modes of USB audio mode or mobile audio mode. FIG. 4 is a block diagram, schematically illustrating a USB audio mode operation, according to an embodiment of the present invention. The USB interface 302 is activated when this USB audio controller 300 is connected to a USB host 400 via the USB bus. In this mode, a processor unit 306 processes the USB protocol and informs to the USB host 400 that the controller 300 can operate as a USB audio device class protocol and a USB storage device class protocol at the same time, also called a USB composite device. To save firmware effort, the controller 300 can have user switch for inputting a switch signal to set the controller operating either as a USB audio device only or as a USB storage device only when the controller 300 is connected to the USB host. The USB audio device class protocol allows the USB audio controller to be operated as the audio peripheral device of the USB host. The USB storage device class protocol allows the USB audio controller to be operated as a removable storage device of the USB host. The storage device interface unit 304 can be externally connected to a storage unit 500 (shown in FIG. 5), such as NAND flash, a memory card, a hard disk, or other kind of non-volatile memory unit. The USB host 400 can read, write, move, delete, copy, or execute files, such as VoIP files, in the storage unit 602 as to be described in FIG. 6.

In USB audio mode operation, user can listen to the audio playback from the USB host 400 via the audio output unit 312 having internal DAC or external DAC unit and record back to the USB host 400 via the audio input unit 314 having internal ADC or external ADC unit. In alternative manner, the USB host can execute dedicatedly developed software. The USB controller and the dedicated software can communicate to each other, so that the USB controller can operate as the USB audio peripheral device or USB storage device of the USB host. Using this kind of operation, the USB controller does not need to match the USB audio device class protocol or USB storage device protocol.

When the controller 300 is operated together with battery set and USB is not connected, it works as a mobile audio player in mobile audio mode. User can listen to the music files stored in the storage unit via the audio output unit 312, or record back to the storage unit via the audio input unit 314.

Figure 5:
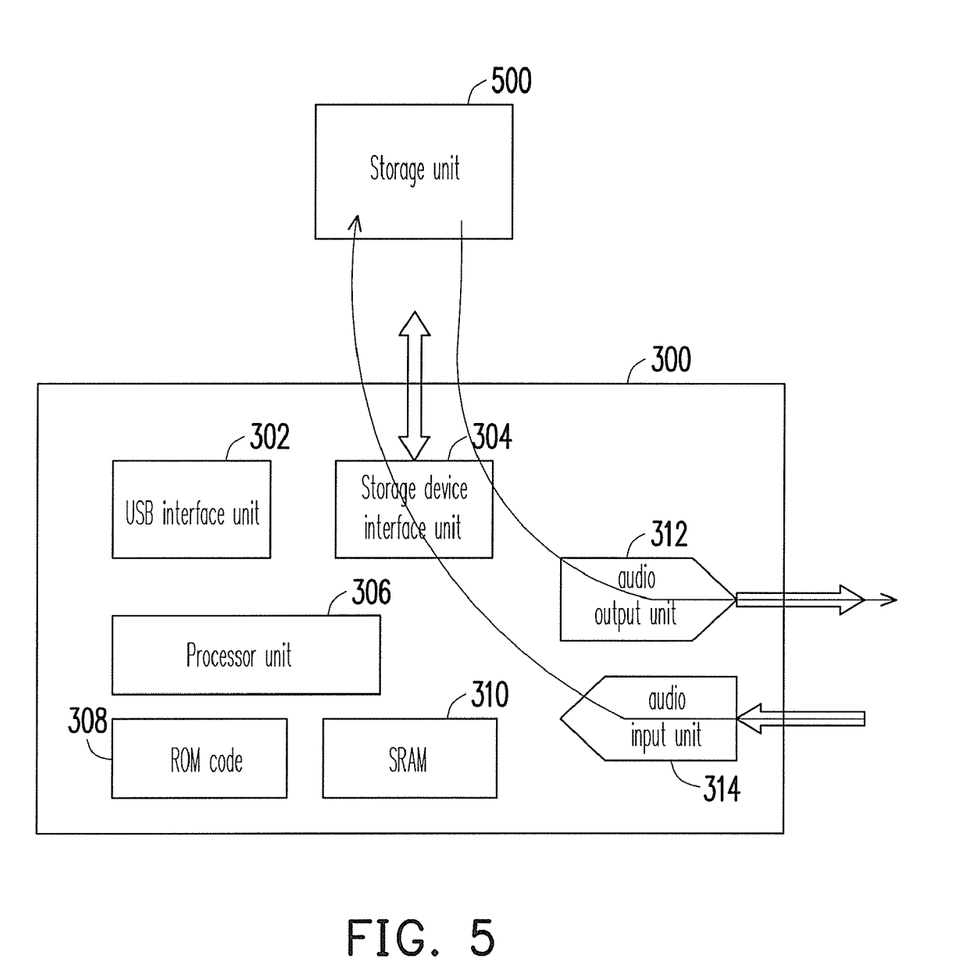
FIG. 5 is a block diagram, schematically illustrating a mobile audio mode operation, according to an embodiment of the present invention.

FIG. 5 is a block diagram, schematically illustrating a mobile audio operation mode, according to an embodiment of the present invention. In FIG. 5, actually, the audio signals are communicating between the storage unit 500 and the audio output unit 312 or the audio input unit 314 of the audio interface unit, without need of the USB interface. Here, the storage unit 500 may be external or embedded in the controller. Further, the memory unit 308 may be serving as the embedded storage unit for storing the audio information. Here, the storage information for communicating with the storage unit can include a first storage information, a second storage information, or both storage information. The first storage information is the original audio signal outputting from the USB host to the audio device via the audio interface unit or the compressed audio signal of the original outputting audio signal when the audio controller is connected to the USB host. The second storage information is the original audio signal inputting from the audio device via the audio interface unit and transmitted to USB host or the compressed audio signal of the original inputting audio signal when the audio controller is connected to the USB host.

In this integrated circuit chip, the processor unit 306, the audio output unit 312, and the audio input unit 314 are activated in both two modes. And the external earphone speaker and microphone (not shown) may be connected to the audio output unit 312 and the audio input unit 314, respectively, used in both modes. Thus this controller is very economic. It can work in two different functions and shares most resources in two different applications.

The audio output unit 312 can be a digital interface with external DAC, or embedded DAC with earphone amplifier for direct earphone connection. The audio input unit 314 can be a digital interface with external ADC, or an embedded ADC with microphone pre-amplifier for direct connection to microphone.

Figure 6:
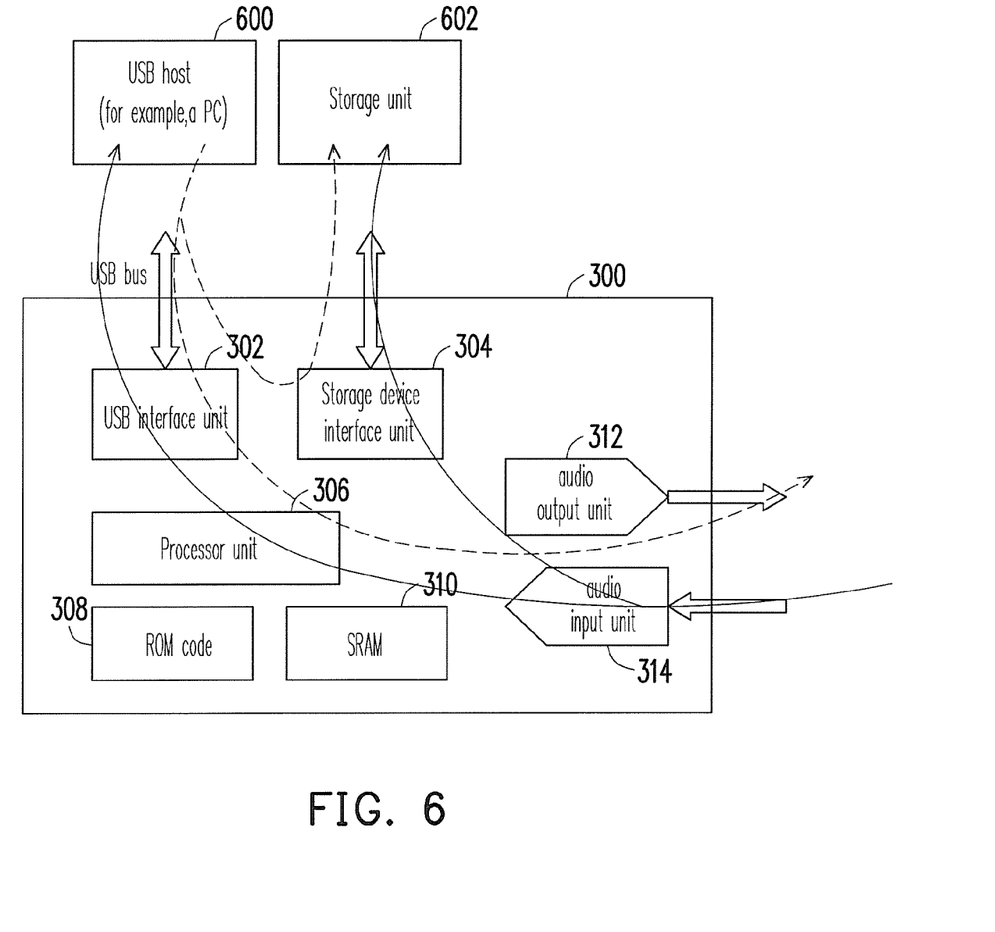
FIG. 6 is a block diagram, schematically illustrating an operation of the USB audio controller, according to an embodiment of the present invention.

FIG. 6 is a block diagram, schematically illustrating an operation of the USB audio controller, according to an embodiment of the present invention. In FIG. 6, actually, various application routes can be set up. As the combination of FIG. 4 and FIG. 5, the separate function can be achieved. The additional function can be even more achieved in USB audio mode. The host 600 can communicate with the external audio source apparatus, such as speaker and microphone, which are connected to the audio output unit 312 and the audio input unit 314. In alternative choice, the storage unit 602, as shown as the storage unit 500 in FIG. 5, can communicate with the external audio source apparatus, such as microphone and speaker. In addition, the host 600 can also communicate with the storage device interface unit 304 when the USB audio controller 300 is connected to the host 600 and the storage unit 602. Further for example, when the audio information is input from the audio input unit 314 to the host 600, the audio information can be stored on the storage unit 602. Alternatively, when the host 600 provides the audio information to the USB audio controller 300 at the audio output unit 312, the audio information can also be stored in the storage unit 602.

In other words, one common application for this composite USB device is for USB VoIP dialog recording application. User talks to the audio input unit 314 and listens to audio data via the audio output unit 312. Both the USB audio stream data go through this controller can be redirected to the storage unit so the two-way talking can be recorded into digital file form without degrade. This recording operation can be processed without additional software effort from the USB host CPU for running recording software. Thus, such operation can ignore the software developing effort needed for interfacing different operating systems (Windows XP, Vista, Mac OS X, Linux, etc) and different VoIP applications (Skype, Microsoft MSN, Yahoo MSN, Google talk, etc). In one embodiment, the simple enable or disable control signals sent from the USB host software are used to control such recording action.

Such audio recording can be applied on other applications besides USB VoIP application; for example, language learning, audio signal mixing, etc.

VoIP application software can be stored in the storage unit 602 or the ROM code 308 in FIG. 6, so that user can execute the VoIP software without any pre-installation of such software in the computer. Here, the storage unit 602 may be also embedded in the USB audio controller 300 in alternative manner. User can carry the apparatus containing this USB audio controller 300 and the storage unit and can easily use the VoIP or other audio application at other computer system without pre-installation for such VoIP software or the audio application software in the other computers.

Another embodiment, satisfying the hardware recording structure in FIG. 6, can be without the function for audio playing or recording in mobile manner. The USB audio function and the USB storage function are activated when the USB controller is connected to the USB host. As a result, the cost can be further reduced. Another embodiment for further cost down, satisfying the hardware recording structure in FIG. 6, can be without the function for audio playing or recording in mobile manner. And only one of the USB audio function or USB storage function is activated which is set by user switch when the USB controller is connected to the USB host. Another embodiment for further cost down, satisfying the hardware recording structure in FIG. 6, can be without the function for audio playing or recording in mobile manner and without the USB storage function. Only the USB audio function is activated when the USB controller is connected to the USB host.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A universal serial bus (USB) audio controller, comprising:
   a USB interface unit, used to connect to a USB bus for communicating with a USB host by a communication information;
   an audio interface unit, used to connect to at least one audio device for communicating with an audio signal;
   a storage interface unit, used to communicate with an external storage unit by a storage information; and
   a processing unit, having at least one processor with data exchange or sharing scheme when multiple processors exist, for processing the communicating information, the storage information, or the audio signal, wherein when the USB interface unit is connected to the USB host, the processing unit processes with respect to a USB device class definition for the audio devices or operates together with a software in the USB host to work as function of a USB external sound card, and processes with respect to USB mass storage class specifications or operates together with a software in the USB host to work as a USB storage device, wherein when the USB interface unit is disconnected from the USB host, the processing unit processes an audio playback function with an audio source from the external storage unit or an audio record function with an audio source from audio interface unit,
   wherein when the USB audio controller is connected to the USB host and works as the USB external sound card, the controller records a first audio information which is from the audio interface unit to the USB host and stores a second audio information which is from the USB host to the audio interface unit to the external storage unit, wherein the first audio information and the second audio information are stored to the external storage unit without involving operation of the USB host.

2. The USB audio controller of claim 1, wherein a user switching function input is provided for a user to select USB audio device only or USB storage device only when the USB audio controller is connected to the USB host.

3. The USB audio controller of claim 1, wherein the audio signal comprises an input audio signal or an output audio signal, and the audio interface unit comprises one audio input unit for receiving the input audio signal or comprises one audio output unit for outputting the output audio signal.

4. The USB audio controller of claim 3, wherein the audio input unit comprises at least one analog-to-digital converter (ADC) circuit, or the audio output unit comprises at least one digital-to-analog converter (DAC) circuit.

5. The USB audio controller of claim 1, wherein the processing unit comprises a capability to compress or decompress an audio compressed format.

6. The USB audio controller of claim 1, wherein a nonvolatile memory unit is embedded in the USB audio controller to communicate with the storage interface unit.

7. The USB audio controller of claim 1, wherein when the USB audio controller is connected to the USB host, the storage information is an original audio signal output to the audio device from the USB host via the audio interface unit or a compressed audio signal of the original audio signal.

8. The USB audio controller of claim 1, wherein when the USB audio controller is connected to the USB host, the storage information is an original audio signal input to the USB host from the audio device via the audio interface unit or a compressed audio signal of the original audio signal.

9. The USB audio controller of claim 1, wherein when the USB audio controller is connected to the USB host, a software for VoIP (Voice over Internet Protocol) application stored in the storage unit is communicating with the USB host via the storage unit and the USB interface unit and is executed by the USB host.

10. The USB audio controller of claim 1, wherein the USB interface unit, the audio interface unit, the storage interface unit, and the processing unit are integrated as a single integrated circuit chip.

11. A universal serial bus (USB) audio controller, comprising:
   a USB interface unit, used to connect a USB bus for communicating with a USB host by a communication information;
   an audio interface unit, used to connect to at least one audio device for communicating with an audio signal;
   a storage interface unit, used to communicate with an external storage unit by a storage information; and
   a processing unit, having a hardware circuit or at least one processor with data exchange or sharing scheme when multiple processors exist, for processing the communicating information, the storage information, or the audio signal wherein the processing unit is in compliant to a USB audio device class protocol with respect to a USB device class definition for the at least one audio device;
   wherein when the USB interface unit is connected to the USB host, the processing unit operates together with a software in the USB host to let the USB audio controller having function of a USB external sound card of the USB host, such that the controller records a first audio information which is from the audio interface unit to the USB host and stores a second audio information which is from the USB host to the audio interface unit to the external storage unit, wherein the first audio information and the second audio information are stored to the external storage unit independent from operations of the USB host; and
   when the USB interface unit is disconnected from the USB host, the processing unit is capable of processing an audio playback function with an audio source from the external storage unit or an audio record function with an audio source from audio interface unit.

* * * * *